United States Patent [19]

Webb et al.

[11] Patent Number: 5,779,810
[45] Date of Patent: Jul. 14, 1998

[54] METHOD TO REMOVE HALOGENATED HYDROCARBONS FROM PARTICULATE MATTER

[75] Inventors: Jimmy Lynn Webb, Ballston Lake; Herman Otto Krabbenhoft, Scotia; David Gilles Gascoyne, Schenectady, all of N.Y.

[73] Assignee: General Electric Company, Schenectady, N.Y.

[21] Appl. No.: 673,484

[22] Filed: Jul. 1, 1996

Related U.S. Application Data

[63] Continuation-in-part of Ser. No. 300,900, Sep. 6, 1994, abandoned.

[51] Int. Cl.$^6$ ........................................ B08B 3/00
[52] U.S. Cl. .............................. 134/3; 134/25.1; 134/30
[58] Field of Search ........................ 134/3, 25.1, 26, 134/30, 40–42

[56] References Cited

U.S. PATENT DOCUMENTS

| | | | |
|---|---|---|---|
| 4,792,413 | 12/1988 | Nash et al. | 252/111 |
| 5,051,030 | 9/1991 | Saha et al. | 405/128 |
| 5,152,844 | 10/1992 | Wilwerding et al. | 134/25.1 |
| 5,156,686 | 10/1992 | Van Slyke | 134/26 |
| 5,256,208 | 10/1993 | Rafson | 134/25.1 |
| 5,342,449 | 8/1994 | Holbein et al. | 134/2 |
| 5,356,482 | 10/1994 | Mehta et al. | 134/22.1 |
| 5,634,983 | 6/1997 | Kammeraad | 134/25.1 |
| 5,637,154 | 6/1997 | Shorthouse | 134/25.1 |
| 5,651,831 | 7/1997 | Kruse | 134/18 |

*Primary Examiner*—Jill Warden
*Assistant Examiner*—Saeed Chaudhry
*Attorney, Agent, or Firm*—James Magee, Jr.; Douglas E. Stoner

[57] ABSTRACT

A method is disclosed for the removal of halogenated organic contaminants from particulate material by admixing a monocarboxylic acid with the particulate material, and passing a vapor phase of steam through the material to substantially remove the halogenated organic contaminant.

1 Claim, No Drawings

METHOD TO REMOVE HALOGENATED HYDROCARBONS FROM PARTICULATE MATTER

CROSS-REFERENCE TO RELATED APPLICATION

This application is a Continuation-In-Part of U.S. application Ser. No. 08/300,900, filed Sep. 6, 1994 abn.

FIELD OF THE INVENTION

This invention is directed to the remediation of particulate material contaminated with halogenated organic compounds. Particularly, the invention relates to the removal of chlorinated organic compounds from materials such as soil, sand, and gravel by mixing a monocarboxylic acid with the contaminated material and then thermally sweeping said material with steam. The invention also is directed to cleansing the material with a vapor phase comprising a monocarboxylic acid and water in the form of steam, thereby removing halogenated organic compounds. Cleansing is achieved through desorption and volatilization of the contaminants.

BACKGROUND OF THE INVENTION

Compounds such as polychlorinated biphenyls (PCBs), dichloro-diphenyl trichloroethane (DDT), tri-chloroethylene (TCE), and chlorinated benzenes have been found to be persistent compounds in the environment. Due to spills and prior usage, these compounds are often found in soil, sludge and building materials. Their disposal requires a safe and efficient means.

Various methods for the removal or destruction of halogenated organic compounds are known. For example, the Peterson U.S. Pat. No. 4,574,013 discloses a process wherein a heated slurry of contaminated soil is treated with a mixture of an alkaline constituent and a sulfoxide catalyst. This process is disadvantageous in that the sulfoxide catalyst may transport contaminants into living systems, the sulfoxide catalyst produces odorous compounds when heated to high temperatures and decomposes into combustible by-products, and the process requires large amounts of reagents.

Additionally, polychlorinated biphenyls in contaminated soils have been destroyed by incineration and surfactant-assisted washing. These methods are quite costly of require complex operations. For example, surfactant-assisted soil-washing requires many unit operations in order to remove the polychlorinated biphenyls from the soil and to regenerate the surfactant wash solution.

Copending and commonly assigned U.S. Pat. application, entitled "Process for Remediation of a Contaminated Particulate Material," filed May 16, 1994, Ser. No. 08/242,768, discloses a method that removes halogenated organic contaminants from particulated material by utilizing a thermal desorption sweep with a vapor stream containing water and an amine or amide organic additive. The contaminated material is cleaned using the process at ambient pressure and a temperature between about 250°–340° C.

A need exists for a method to remediate contaminated materials which obtains acceptable removal levels of halogenated organic contaminants from particulate material at temperatures between about 300°–400° C. The method needs to utilize reagents that are relatively inexpensive, safe to handle, and work efficiently. Further, there is a need for a method that can utilize monocarboxylic acids, fatty acid mixtures derived from natural triglycerides, such as tallow, tall oil, coconut oil, soybean oil, corn oil, and peanut oil, as well as saturated and unsaturated monocarboxylic acids, to substantially remove halogenated organic contaminants from particulate material.

SUMMARY OF THE INVENTION

This invention provides an effective process for desorption and volatilization of non aqueous liquid phase contaminants from particulate materials such as sand, gravel, crushed concrete, soils, and the like. Examples of non aqueous liquid contaminants include chlorination products of methane (methylene chloride, chloroform, carbon tetrachloride), ethane (1,1-dichloroethane, 1,2-dichloroethane, 1,1,1-trichloroethane, 1,1,2,2-tetrachloroethane), ethene (1,1-dichloroethane, 1,2-dichloroethene isomers, trichloroethene, tetrachloroethene), propane (1,2-dichloropropane, 1,3-dichloropropene isomers), and benzene (chlorobenzene, 1,2-dichlorobenzene, 1,4-dichlorobenzene); fluorination products of methane and ethane such as 1,1,2-trichlorofluoromethane (Freon-11) and 1,1,2-trichlorofluoroethane (Freon-113); and, bromination products of methane (bromochloromethane, dibromochloromethane, dibromodifluoromethane, bromoform), ethane (bromoethane, 1,1,2,2-tetrabromoethane), ethene (ethylene dibromide), and propane (1,2-dibromo-3-chloropropane).

This invention comprises a method for the removal of halogenated organic compounds dispersed within contaminated particulate material by the combined action of a monocarboxylic acid and a cleaning vapor phase, consisting essentially of steam, which is swept through the material at a temperature between about 300°–400° C., for a time sufficient to substantially remove the halogenated compounds from the particulate material.

Monocarboxylic acids that are suitable for use in the process of this invention can be short-chain or long-chain acids, saturated or unsaturated acids, naturally occurring compositions, and mixtures thereof. Examples of such acids include, formic acid, acetic acid, propionic acid, butyric acid, valeric acid, hexanoic acid, octanoic acid, oleic acid. Fatty acid mixtures derived from natural sources of fats and oils such as triglycerides, beef tallow, tall oil, corn oil, peanut oil, soybean oil, and coconut oil, and the like.

Besides adding the organic acids directly to the particulate material prior to sweeping the material with the vapor phase, it has been found that monocarboxylic acids, are also effective when fed directly into the vapor phase stream itself. Thus, the invention also encompasses a method for the removal of halogenated organic compounds dispersed within contaminated particulate material where the material is contacted with a vapor phase consisting essentially of water and a monocarboxylic acid at a temperature between about 300° to 400° C., for a sufficient amount of time to reduce the amount of the halogenated organic compounds to about ten parts per million or less.

Thus, an object of this invention is to provide a simple process that would remediate particulate material contaminated with polychlorinated biphenyls and other halogenated organic compounds so that the residual contaminant level in the material is less than about ten parts per million, preferably less than about five parts per million, and more preferably, less than about two parts per million.

It is also an object of this invention to provide a method wherein environmentally acceptable levels of halogenated organic compounds are achieved in treated materials within a short period of time in a cost effective manner.

DETAILED DESCRIPTION OF THE INVENTION

A method is taught for the remediation of particulate material contaminated with halogenated organic compounds which comprises the steps of admixing the particulate material with an effective amount of a monocarboxylic acid additive; and contacting an admixture of particulate material and additive with a vapor phase comprising water in the form of steam at a temperature between about 300°–400° C., for a time sufficient to remove substantially all of the halogenated organic compounds from the particulate material whereby residual amount halogenated organic compound in the particulate material is reduced to less than about 10 parts per million.

The term "substantially remove" means that about ten parts per million or less of halogenated organic contaminant remain in the particulate material after completion of treatment. Using the method of this invention, a sufficient amount of time to reduce the concentration to this level is generally about ten to about thirty minutes.

The term "effective amount of a mono-carboxylic acid additive" as used herein means about one to fifteen weight percent of the additive based on the weight of contaminated material, is mixed with the contaminated particulate material or delivered with the steam. About two to five weight percent of the additive has been found to be effective.

The term "halogenated organic compounds" as contaminants includes aliphatic compounds, such as, trichloroethylene, trichloroethane, and perchloroethylene; and aromatic compounds, such as, but not limited to, polychlorinated biphenyls, dioxins, chlorobenzene, and pentachlorophenols. Brominated organic compounds that can be removed by the claimed process of this invention.

The process is conducted at temperatures compatible with hot oil heating systems. Such process temperatures range from about 300°–400° C. A preferred temperature range is about 330°–370° C., and a most preferred temperature range is about 345°–355° C.

The contaminated particulate materials to which the process can be applied are generally porous materials which absorb or adsorb the contaminant such as soil, sand, sludge, sediment, gravel, pulverized concrete, and the like. The present method is particularly adapted for use with soil. Various monocarboxylic acids, both short carbon chain and long carbon chain compounds, saturated and unsaturated acids, and mixtures thereof, are suitable for use as desorption enhancing additives in this invention. Of these, certain compounds significantly enhance the process of stripping halogenated organic contaminants from particulate material at temperatures between about 300°–400° C. In particular, formic acid, acetic acid, propionic acid, butyric acid, valeric acid, hexanoic acid, octanoic acid, oleic acid, and the like, are especially effective. Also effective are fatty acid mixtures derived from natural sources such as beef tallow and coconut oil, which are mixtures of long carbon chain monocarboxylic acids. Such mixtures generally have eight or more carbons in the chain.

As an example of the invention, the use of formic acid or acetic acid, admixed with soil, is effective for the removal of halogenated organic compounds from particulate materials. Table 1 demonstrates the results with varying amounts of these additives mixed with soil contaminated with about 700 and about 9500 parts per million of polychlorinated biphenyls. The process time for each sample is fifteen minutes at about 350° C.

TABLE 1

Effect of Formic Acid and Acetic Acid as an Additive for Removal of Polychlorinated Biphenyls from Soil

| Sample | Additive (wt. %) | Flow ml/min | Temp. °C. | Residual PCBs ppm |
|---|---|---|---|---|
| 1 | none | 0.1 | 349 | 12.6 |
| 2 | Formic Acid (5%) | 0.1 | 352 | 0.7 |
| 3* | Formic Acid (1.8%) | 0.13 | 355 | 9.4 |
| 4* | Acetic Acid (2.2%) | 0.13 | 355 | 9.4 |
| 5* | none | 0.13 | 353 | 17.6 |

*The soil examined had an initial polychlorinated biphenyl concentration of about 9500 parts per million.

The additives in Table 1 were added directly to the soil prior to treatment with steam. It is shown that the employment of the additives provides more effective removal of halogenated organic contaminants from the soil than steam alone.

It further has been found that by adding about five percent by weight or less of formic acid to soil contaminated with about 700 parts per million polychlorinated biphenyls, sample 1, above, and then passing steam through the soil for about fifteen minutes, can reduce the polychlorinated biphenyl to less than one part per million.

The selection of the monocarboxylic acid used in the method of this invention may be dependent on its physical properties and cost effectiveness. For instance, lower carbon chain monocarboxylic acids generally have lower boiling points than long carbon chain acids, but longer carbon chain acids, and mixtures thereof, tend to more effectively remove the halogenated organic contaminants. This is demonstrated in Table 2.

It should be pointed out that the experiments generating data in Table 2 were chosen to reveal the differences in performance of the monocarboxylic acid additives, not to clean the soil to the two part per million residual target level. If two parts per million is the desired removal target, than the parameters of the method may be adjusted to achieve this. Specifically, such parameters include the temperature of operation and the length of time for carrying out the operation.

Table 2 contains results using short and longer carbon chain monocarboxylic acids. It is important to note that the level of residual polychlorinated biphenyls in the treated soil generally decreases as the length of the carbon chain of the acid increases.

The results in Table 2 are based on soil containing 9000 parts per million polychlorinated biphenyls. The time for the process was fifteen minutes and the flow rate of the water vapor phase was 0.13 milliliters per minute.

TABLE 2

Polychlorinated Biphenyl Removal From Soil Using Monocarboxylic Acids With Varying Carbon Chain Lengths

| Acid Additive | boiling point °C. | weight % | Temp °C. | Residual PCBs ppm |
|---|---|---|---|---|
| water | 100 | — | 331 | 25.5 |
| Formic Acid (C1) | 100.5 | 2.5 | 333 | 13.1 |
| Acetic Acid (C2) | 118 | 2.5 | 331 | 25.3 |
| Propionic Acid (C3) | 141 | 3.1 | 326 | 18.7 |

TABLE 2-continued

Polychlorinated Biphenyl Removal From Soil Using
Monocarboxylic Acids With Varying Carbon Chain Lengths

| Acid Additive | boiling point °C. | weight % | Temp °C. | Residual PCBs ppm |
|---|---|---|---|---|
| Butyric Acid (C4) | 162 | 2.5 | 335 | 10.1 |
| Valeric Acid (C5) | 185 | 4.3 | 331 | 10.2 |
| Hexanoic Acid (C6) | 202 | 2.5 | 332 | 7.9 |
| Octanoic Acid (C8) | 237 | 2.5 | 340 | 3.7 |
| Oleic Acid (C18) | 390 | 2.5 | 330 | 6.2 |

The results in Table 2 show that the residual polychlorinated biphenyl in the soil decreases with increasing carbon chain length of the monocarboxylic acid. The only deviation from this was found to be oleic acid, with a carbon length of eighteen. It is believed that the slightly higher residual amount of polychlorinated biphenyls using oleic acid, in comparison to octanoic acid, is because the temperature of operation, 330° C., was far below the boiling point of oleic acid, 390° C. As a result, the temperature difference between the soil and the boiling point of the additive needs to be considered when choosing the parameters for operation of this invention. It is possible to operate this process at higher temperatures in order to accommodate an additive with a high boiling point.

Additionally, it has been discovered that monocarboxylic acids are also effective when fed directly into the vapor stream, rather than being first admixed with the contaminated soil. The amount of organic acid fed into the vapor stream may be about one to fifteen weight percent, and preferably two to five weight percent based on the weight of the contaminated material. Thus, the invention also encompasses a method for the removal of halogenated organic compounds dispersed within contaminated particulate material where the material is contacted with a vapor phase consisting essentially of water in the form of steam and a desorption enhancing monocarboxylic acid at a temperature of about 300° to about 400° C., for a sufficient amount of time to substantially remove the halogenated organic compounds from the particulate material.

The process of this invention can be carried out by methods known in the art. Example 1 demonstrates one manner of performing this invention.

EXAMPLE 1

In the practice of this invention, in a typical experiment, a stainless steel cell, such as a one-inch diameter tube equipped with Swagelok fittings at each end, was filled with a mixture of polychlorinated biphenyl-contaminated soil and the selected additive. After connecting inlet and exit lines, 1/16inch tubing, the cell is immersed in a molten salt bath while simultaneously initiating the flow of water by means of high pressure liquid pump. The coiled inlet tube is of sufficient length so as to permit the water to become completely vaporized and reach the temperature of the molten salt bath before entering the cell and contacting the soil. The effluent from the cell is passed through a condenser so that the water, polychlorinated biphenyls, and any other volatiles from the soil are condensed. After a period of time, the flow of water is stopped and the cell removed from the molten salt bath; the soil is then removed from the cell and analyzed for residual polychlorinated biphenyl content. Tables 1–2 collect the relevant data for Example 1.

What is claimed is:

1. A process for the removal of halogenated organic compounds adsorbed on particulate material, comprising: contacting the material with a vapor phase consisting essentially of water and a monocarboxylic acid selected from the group consisting essentially of acetic acid, propionic acid, butyric acid, valeric acid, hexanoic acid, octanoic acid, oleic acid, fatty acid mixtures derived from natural sources selected from the group consisting of triglycerides, at a temperature between about 300°–400° C. for about 10–30 minutes to substantially remove the halogenated organic compounds from the particulate material so that ten parts per million or less of the halogenated organic compounds remain in the particulate material.

* * * * *